United States Patent [19]

Oboshi et al.

[11] Patent Number: 4,597,168
[45] Date of Patent: Jul. 1, 1986

[54] METHOD AND APPARATUS FOR PRODUCING LAMINATED IRON CORES

[75] Inventors: Takamitsu Oboshi, Fukuoka; Tomoaki Koga; Eiji Imoto, both of Kitakyushu, all of Japan

[73] Assignee: Mitsui High-Tec, Inc., Yahatanishi, Japan

[21] Appl. No.: 656,603

[22] Filed: Oct. 1, 1984

[30] Foreign Application Priority Data

Oct. 3, 1983 [JP] Japan .................................. 58-184871

[51] Int. Cl.⁴ .......................................... H02K 15/02
[52] U.S. Cl. .................................. 29/596; 29/598; 29/732
[58] Field of Search ................... 29/596, 598, 732; 310/216, 217

[56] References Cited

FOREIGN PATENT DOCUMENTS 896718 1/1980 U.S.S.R. ............................... 29/596

Primary Examiner—Howard N. Goldberg
Assistant Examiner—Leonard S. Selman
Attorney, Agent, or Firm—Spensley Horn Jubas & Lubitz

[57] ABSTRACT

A method and apparatus for producing laminated iron cores wherein a new skew angle $\Delta\theta$ is calculated when the total thickness of core sheets in a laminated iron core currently being produced reaches a predetermined value $L_o$, or during a time period after the number of such laminated core sheets reaches a predetermined value $n_A$ before the total thickness reaches the predetermined value $L_o$, so that a skewing operation for laminated iron core to be next made is carried out on the basis of the new skew angle $\Delta\theta$.

5 Claims, 14 Drawing Figures

FIG. 3 (a)
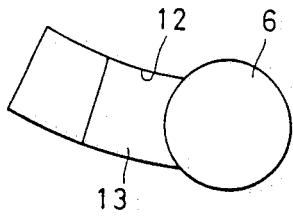
FIG. 4 (a)
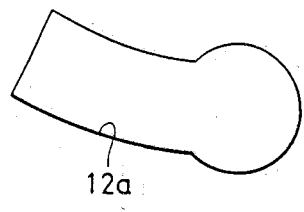
FIG. 3 (b)
FIG. 4 (b)
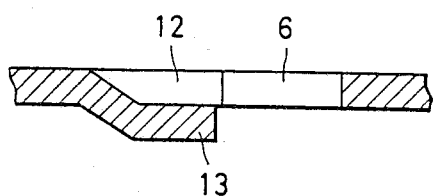
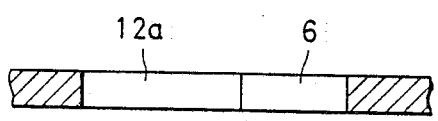
FIG. 5
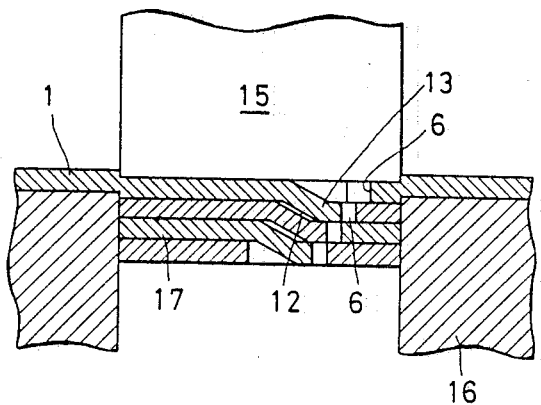

METHOD AND APPARATUS FOR PRODUCING LAMINATED IRON CORES

BACKGROUND OF THE INVENTION

1. Field of the Invention

The present invention relates to a method and apparatus for producing laminated iron cores each having a predetermined skew amount by stacking iron core sheets while performing a skewing operation.

2. Description of the Prior Art

A laminated iron core used in a rotor or the like for an electric motor is usually formed therein with oblique or skew slots for the purpose of improving its electrical characteristics. In order to make such slots, it is necessary to sequentially shift respective slot holes formed in each iron core sheet. To this end, a metallic mold apparatus for manufacturing this types of laminated iron cores has a so-called skewing function, for example, as disclosed in U.S. Pat. No. 3,110,831.

However, in such a conventional mold apparatus having the skewing function, the thickness of the laminated iron core (sometimes referred to as a product, hereinafter), that is, the total thickness of the laminated core sheets is controlled according to the number of such core sheets. Therefore the apparatus has a disadvantage that, when the thickness of the core sheet changes, the thickness of the resultant product correspondingly changes. Such a disadvantage can be prevented by using the total thickness of laminated sheets in place of the number of such laminated core sheets to control the thickness of a product. However, in this case, there unfavorably takes place variations in the skew angle of the product for the following reason.

That is, in such a conventional apparatus, each time a piece of iron core sheet is piled on the uppermost sheet, the skewing operation is effected by a constant skew angle (for example, 0.1°–0.2°) and therefore the skew amount (the skew of the product depends on the number of laminated iron core sheets because the skew amount is expressed by angle times the number of laminated iron core sheets. As a result, when the thickness of the iron core sheet changes and correspondingly the number of laminated core sheets varies from product to product, the skew angle varies depending on these products.

SUMMARY OF THE INVENTION

It is an object of the present invention to provide a method and apparatus which can produce laminated iron cores having a proper skew amount and thickness even when the thickness of an iron core sheet varies.

The above object is attained by providing a method and apparatus for producing laminated iron cores having a predetermined skew amount by stacking iron core sheets while performing a skewing operation, said method comprising sequentially measuring the number and total thickness of laminated iron core sheets in a laminated iron core currently being produced, finding a new skew angle $\Delta\theta = \theta_o/n$ on the basis of a preset skew amount $\theta_o$ and the number "n" of such core sheets at a time the laminated-sheets thickness reaches a preset value $L_o$, and performing the skewing operation over a laminated iron core to be next produced on the basis of the new skew angle $\Delta\theta$.

More specifically, a predetermined calculation is carried out to find the new skew angle $\Delta\theta$ during a time period after the number of laminated core sheets reaches a preset value $n_A$ before the total thickness of such laminated core sheets reaches a preset value $L_o$, and then the skewing operation is effected over a laminated iron core to be next made on the basis of the new skew angle $\Delta\theta$.

In accordance with the present invention, a proper skew angle can be set according to variations in the thickness of the iron core sheets and thus laminated iron cores having a good quality can be made.

BRIEF DESCRIPTION OF THE DRAWINGS

FIGS. 3(a) and (b) respectively show enlarged plan and vertical cross-sectional views of a holeprojection portion in the strip of FIG. 2;

FIGS. 4(a) and (b) respectively show enlarged plan and vertical cross-sectional views of the hole projection portion with the projection removed;

FIG. 5 is a vertical cross-sectional view showing a state in which an iron core piece is pressingly cut out of the strip and calked together with the already-cut core pieces by a punch;

DETAILED DESCRIPTION OF PREFERRED EMBODIMENTS

Figure 1:
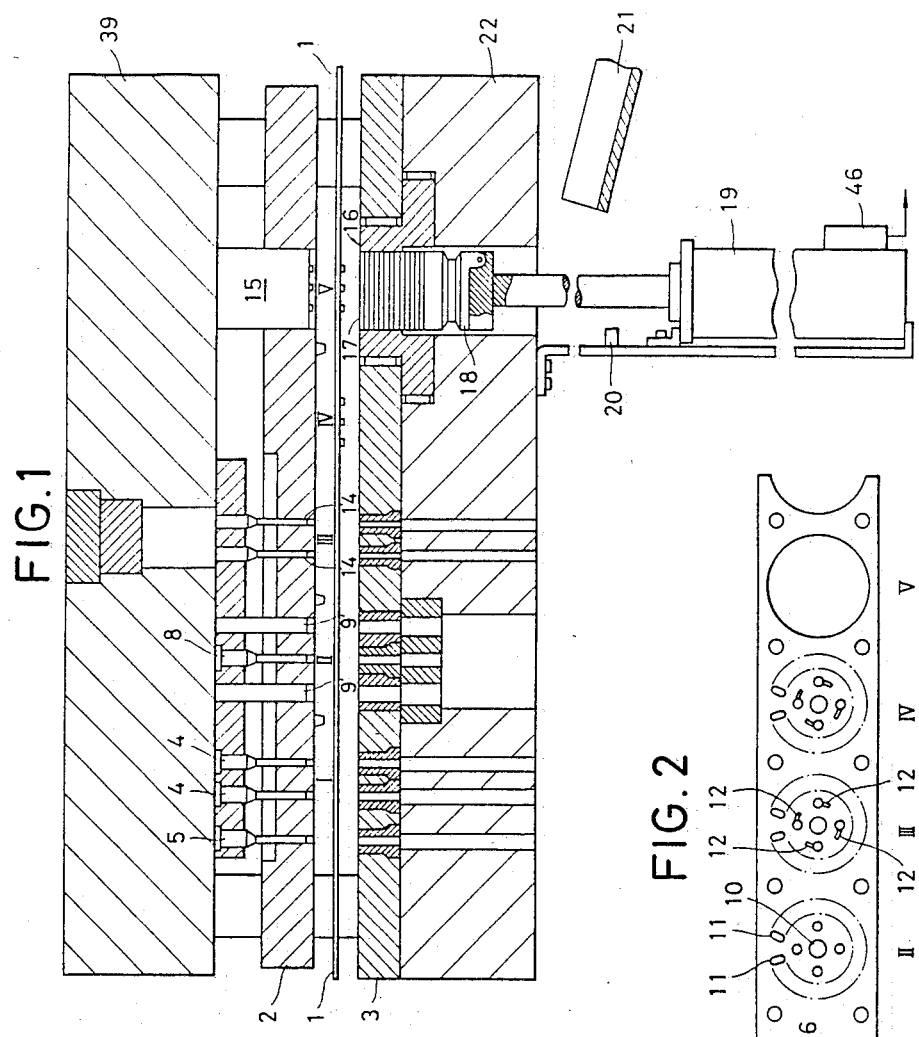
FIG. 1 is a vertical cross-sectional view showing an arrangement of a molding section of a progressive metal mold apparatus to which a method of the present invention is applied.
Figure 2:
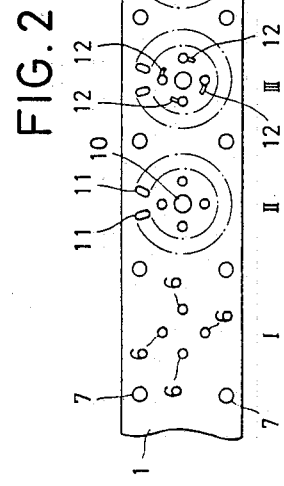
FIG. 2 is a plan view of a strip material illustrating how the strip is machined therein.

Referring to FIG. 1, there is shown an internal arrangement of a progressive metal mold apparatus to which the method of the present invention is applied. In the drawing, reference numeral 1 is a strip which is used as the material of laminated iron core for motor rotor. The strip 1 is fed into a gap between a strip plate 2 and a die plate 3. At a first station I, the strip 1 is subjected to punching operations by punches 4 and 5 and consequently is formed therein with such round escape holes 6 for a skewing operation and pilot holes 7 as shown in FIG. 2. At a second station II, the strip 1 is subjected to punching operations by punches 8 and 9 to thereby have a shaft hole 10 and slot holes 11 made therein. At a third station III, holes 12 and projections 13 (refer to FIGS. 3(a) and (b) as an example of calking means are made in the strip 1 so that the hole 12 communicates with the associated round escape hole 6. Further, at the third station, the projections 13 are cut off by punches 14 for every feed of the strip by a predetermined amount of pitches, as illustrated in FIGS. 4(a) and (b). When this cut-off process has been carried out, the strip is formed therein with through holes 12a corresponding to the projections 13. A fourth station IV is an idle station and thus no machining is done. When reaching a fifth station V, the strip 1 is blanked into core sheets or pieces 17 constituting a laminated iron core for a rotor by means of a punch 15 and a rotary die 16 and then the pieces 17 are subjected to a calking operation. More specifically, as shown in FIG. 5, the iron core pieces 17 drawn into the die 16 are laminated so that the projecton 13 of the subsequently drawn iron core piece fits into the hole 12 of the previously drawn one, whereby the laminated iron core pieces are integrally coupled each other.

Since there is no projection in the through hole 12a of the strip piece shown in FIG. 4(b), the piece is not calked during the above blanking and calking operation. In other words, such a piece having the hole 12a is interposed as a separating core between the laminated and coupled iron core assemblies each time a predetermined number of such iron core pieces 17 are integrally assembled.

When a predetermined number of such laminated rotor iron cores are mounted on a base 18 pressingly inserted into the die 16, an air cylinder 19 is actuated and the base 18 is moved down. When the base 18 abuts against a projection 20, the base is inclined and the laminated cores are discharged on a shute 21.

Figure 6:
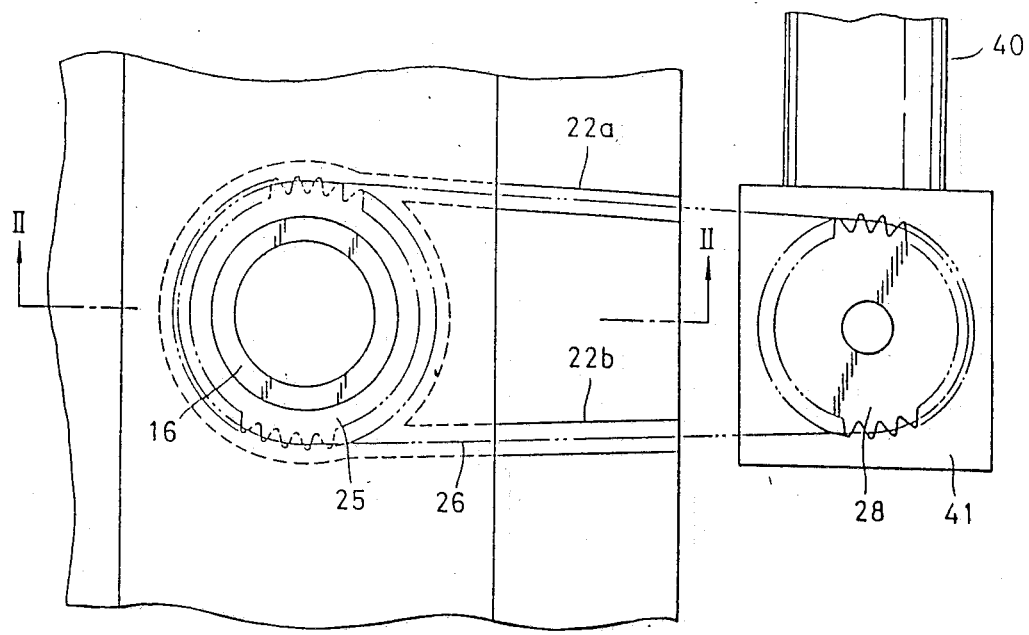
FIG. 6 is a plan view of a rotary die portion and associated rotating means in the apparatus of FIG. 1.
Figure 7:
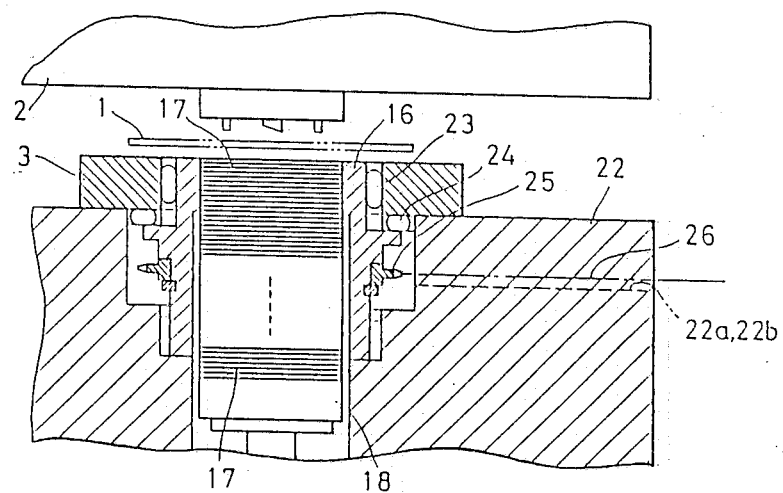
FIG. 7 is a vertical cross-sectional view of the rotary die portion.
Figure 8:
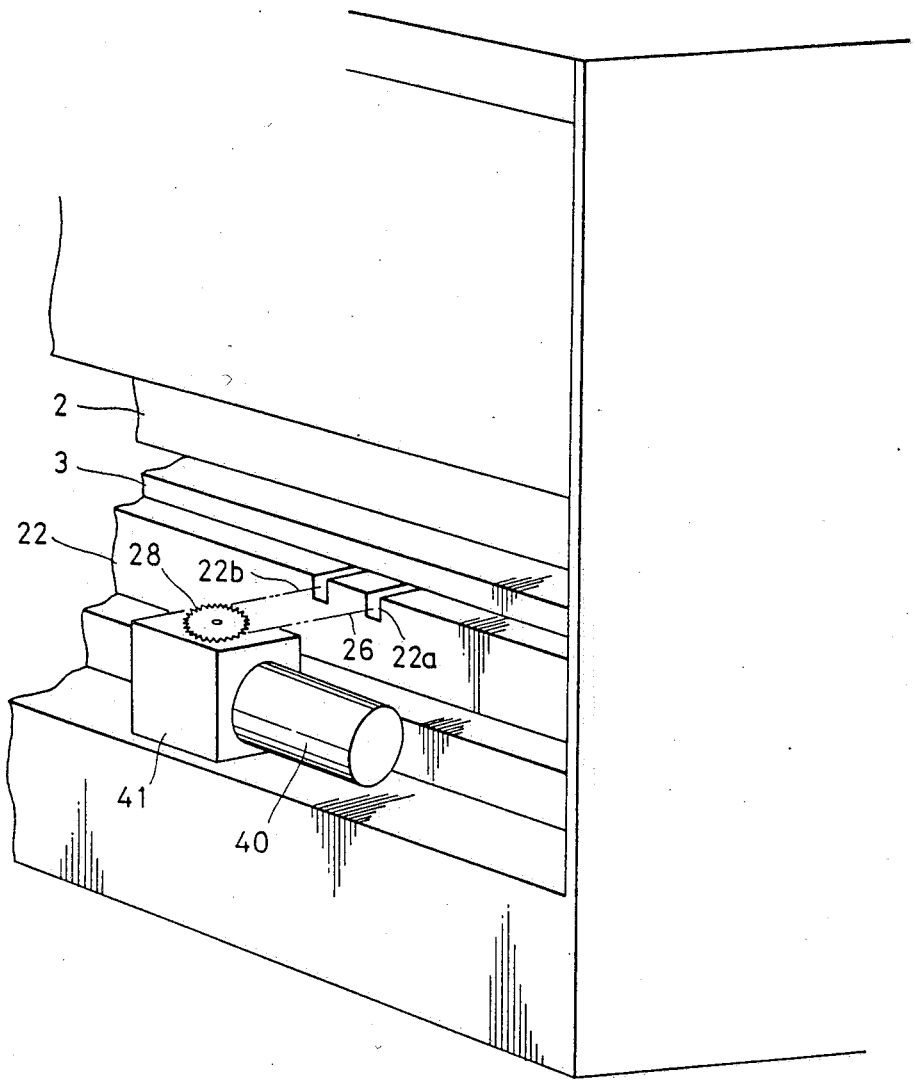
FIG. 8 is a perspective view showing how the rotating means of the rotary die are installed.

As shown in FIGS. 6 and 7 (but not shown in FIG. 1), the die 16 is rotatably supported through bearings 23 and 24 in the die plate 3 and a die holder 22, and is mounted at its outer periphery with a sprocket 25. A link chain 26 engaged to the sprocket 25 extends through grooves 22a and 22b provided in the die holder 22 and runs around a sprocket 28 installed outside the die holder.

The sprocket 28 is mounted on an output shaft of a reduction gear device 41 which in turn is driven by a servomotor 40, so that the sprocket receives a rotational power for the skewing operation from the servomotor 40 through the reduciton gear device 41.

Figure 9:
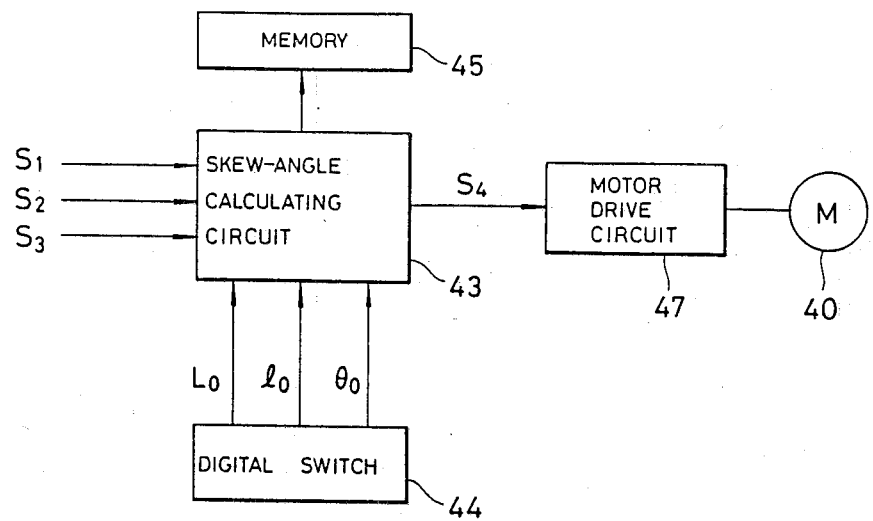
FIG. 9 shows a block diagram of an example of a control circuit for controlling the rotating means shown in FIG. 6.
Figure 10:
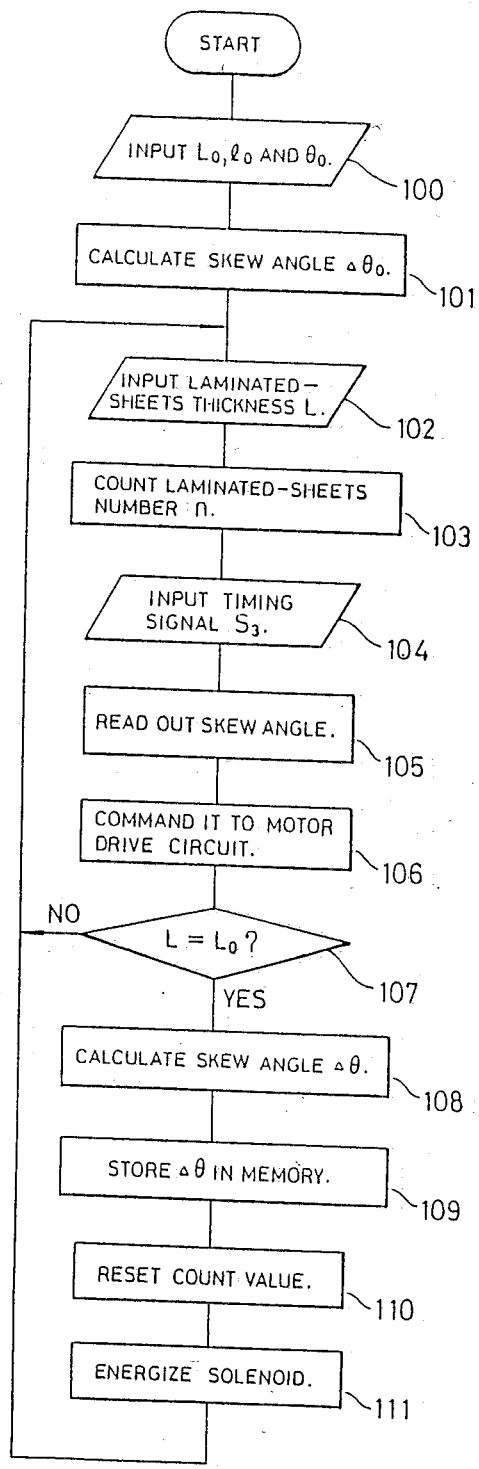
FIG. 10 is a flow chart showing an embodiment of the method according to the present invention.

The servomotor 40 is controlled by such a skew-angle calculating circuit 43 shown in FIG. 9 as a microprocessor. FIG. 10 is a flow chart for explaining the processing contents of the calculating circuit 43. Next, an embodiment of the method for producing laminated iron cores according to the present invention will be explained with reference to FIG. 10.

The circuit 43, first of all, receives a desired thickness $L_o$ of a laminated iron core, a pre-measured thickness $l_o$ of the each iron core sheet piece 17 and a skew amount $\theta o$ regarding the desired laminated-sheets thickness $L_o$ from a digital switch 44 (step 100), calculates the number $N_o (=L_o/l_o)$ of such laminated core sheets 17 on the basis of these input data, and calculates a skew angle, $\Delta \theta_o (=L_o/N_o)$ on the basis of the sheet number $N_o$ and laminated core thickness $L_o$ (step 101). The calculated skew angle $\Delta \theta_o$ is stored in a memory 45 shown in FIG. 9.

When the skew angle $\Delta \theta_o$ has been calculated, the mold apparatus starts its operation. The circuit 43 also receives an output signal $S_1$ from a stroke sensor 46 (such as a linear potentiometer) attached to the air cylinder 19 as illustrated in FIG. 1, that is, a signal indicative of the current thickness L of the laminated iron core sheets 17 (step 102), and counts the number of press strokes, that is, the number "n" of core sheets 17 drawn into the die 16 shown in FIG. 1 on the basis of an output signal $S_2$ from a rotary cam switch (not shown) mounted on the press (step 103).

The circuit 43 further receives a timing signal $S_3$ for the skewing operation from the rotary cam switch (step 104), reads out the skew angle $\Delta \theta_o$ (already calculated at the step 101) from the memory 45 (step 105), and applies to a motor drive circuit 47 (see FIG. 9) a command signal $S_4$ for causing the rotation of the die 16 by the skew angle $\Delta \theta_o$ (step 106). As a result, the die 16 is rotated by the skew angle $\Delta \theta_o$. Next, at a step 107, it is judged whether or not the laminated core thickness L has reached the predetermined value $L_o$. So long as the judgement at the step 107 is NO, the processings of the steps 102 to 106 are repetitively executed. In other words, the iron core pieces 17 are sequentially punched and drawn into the die 16 shown in FIG. 1.

The skewing operation of the die 16 caused by the operation of the servomotor 40 is terminated on the basis of the timing signal $S_3$ at the step 104 just before the punch 15 shown in FIG. 1 punches the strip 1. Therefore, just after the die 16 has been skewed, a new iron core piece 17 is drawn into the die 16, at which time there takes place a positional shift corresponding to the skew angle between the newly drawn core piece 17 and the uppermost one 17 within the die 16. That is, the both core pieces 17 are stacked as shifted by the skew angle with respect to the slot hole 11.

As a result, the core pieces 17 sequentially drawn into the die 16 are piled and calked so that the slot holes 11 of the adjacent core pieces 17 are in a positionally-shifted relation by the skew angle.

On the other hand, when the judgement at the step 107 is YES, that is, when the first laminated iron core has been produced, the circuit 43 calculates a new skew angle $\Delta \theta (=\theta_o/n)$ on the basis of the then count value "n" of the iron core pieces 17 and the predetermined skew amount $\theta_o$ received at the step 100 (step 108), and sends the new skew angle $\Delta \theta$ to the memory 45 to be stored therein (step 109). Then, the count value "n" is reset to zero (step 110) and a solenoid (not shown) is energized (step 111).

The solenoid, when energized, causes the punch 15 shown in FIG. 1 to move downward beyond a predetermined level and to cut off the projection 13 shown in FIGS. 3(a) and (b). When the laminated core piece thickness L has become the desired thickness $L_o$, a separating core piece without no projection 13, i.e., not calked is drawn into the die 16.

After this, the production of the second laminated iron core is started and the calculating circuit 43 again executes the contents or processings shown at the steps 102 to 107. In this execution, the skew angle read out at the step 105 corresponds to the skew angle $\Delta \theta$ calculated at the step 108. Therefore, if a variation in the thickness of the strip 1 causes a variation in the thickness of the laminated iron core pieces 17 during production of the first laminated iron core, a proper skew angle corresponding to this variation is applied to the production of the second iron core.

As a result, in this embodiment, the skew angle $\Delta \theta$ of a laminated iron core to be next produced can be set on the basis of the number of laminated iron core sheets 17 in the currently-produced iron core and the predetermined skew amount $\theta_o$. Accordingly, when variations in the thickness of the iron core sheets 17 causes a change of the skew amount (the number of laminated core sheets 17 times the skew angle), the skew angle of a laminated iron core to be next produced can be corrected.

Meanwhile, the calculation of the skew angle $\Delta\theta$ shown at the step 108 must end before the processing of the step 105 in the next press cycle, and thus the calculating circuit 43 must have a high-speed calculating ability.

Figure 11:
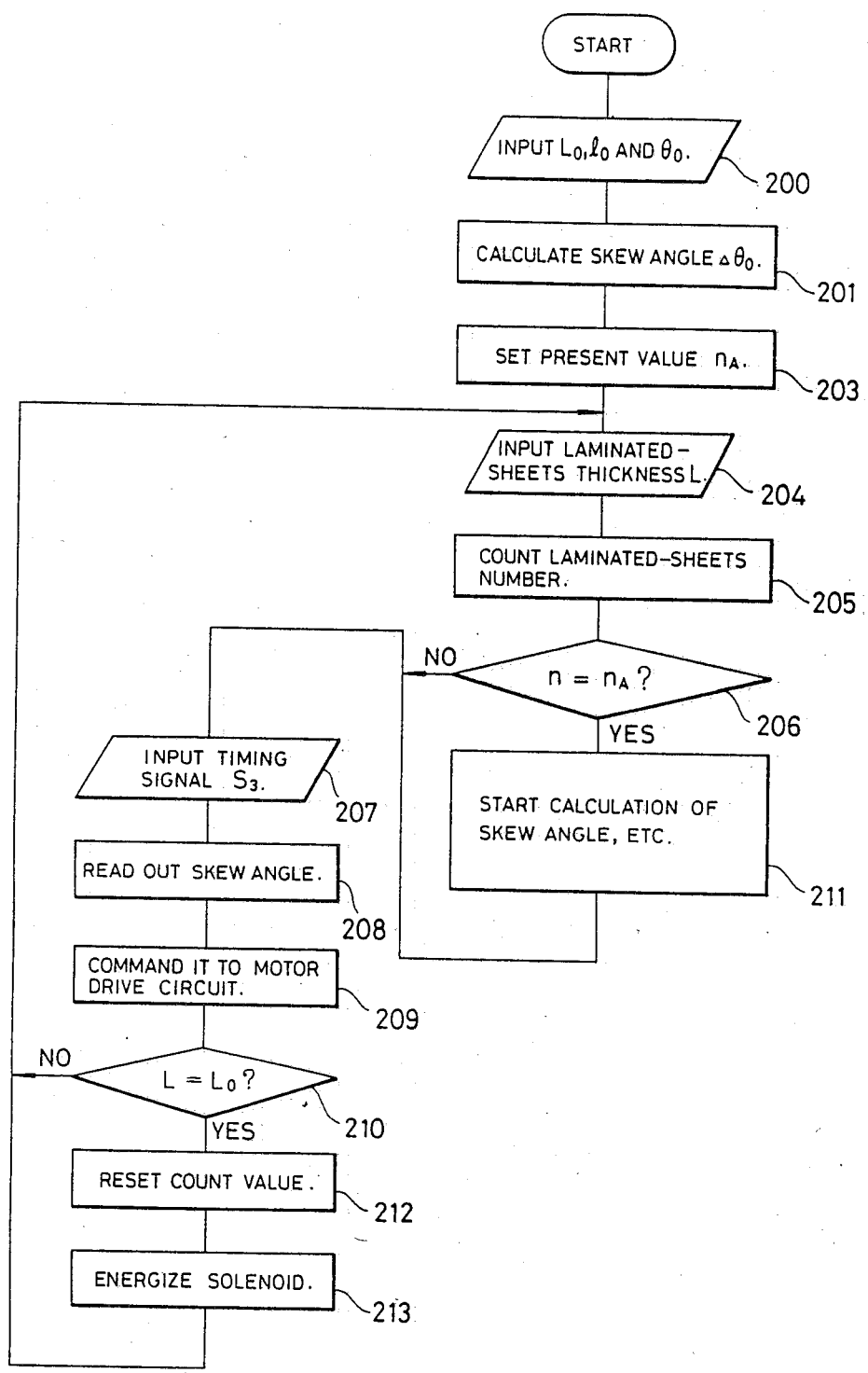
FIG. 11 is a flow chart showing another embodiment of the present invention.

FIG. 11 shows another embodiment of the present invention wherein the calculation time of the skew angle can be sufficiently obtained.

In this embodiment, processings similar to those at the steps 100 and 101 in FIG. 10 are executed at steps 200 and 201 and then the number "$n_A$" of laminated core sheets (which will be explained later) is preset at a step 203. As in the former embodiment, the circuit 43 receives the thickness L of the laminated iron core sheets 17 (step 204), counts the number "n" of laminated sheets (step 205) and then judges whether or not the count value "n" becomes equal to the preset value "$n_A$" given at the step 203 (step 206).

The preset value "$n_A$" is set to be about $\frac{2}{3}$ or $\frac{3}{4}$ times the number of laminated sheets determined by the preset laminated sheet thickness $L_o$ and the single sheet thickness $l_o$.

When the judgement at the step 206 is NO, the contents or processings of steps 207 to 210 similar to those of the steps 104 to 107 and the contents or processings of the steps 204 to 206 are repetitively executed to continue the lamination operation of the iron core sheets 17.

As the iron core sheets 17 are piled, the number "n" of laminated sheets reaches the preset value "$n_A$" before the judgement at the step 210 becomes YES. That is, the judgement at the step 206 becomes YES. Then control is transferred to a step 211 to start the calculation of the skew angle and the storage of the calculation result into the memory 45. When iron core sheets 17 are further stacked and the laminated-sheets thickness L reaches the preset value $L_o$, that is, when the judgement at the step 210 becomes YES, the count value "n" is set to zero (step 213) and the solenoid for formation of the separation core piece is energized (step 213).

Figure 12:
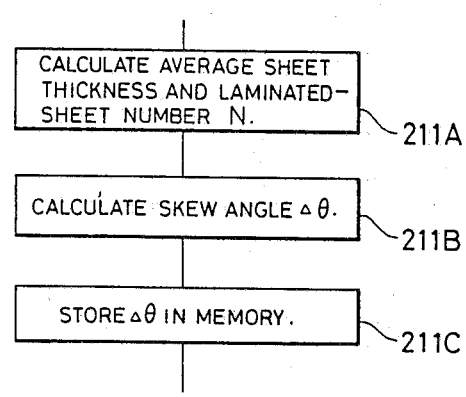
FIG. 12 is a flow chart showing a part of the processing contents of FIG. 11.

The processing contents started at the step 211 are as shown in FIG. 12. More specifically, at a step 211A, the average single-sheet thickness $l$ ($=L_A/n_A$) of $n_A$ core sheets 17 currently being piled is calculated on the basis of the laminated-sheets thickness $L_A$ and the count value $n_A$ at a point when the judgement at the step 206 becomes YES, and a new laminated sheet number N ($=L_o/l$) is calculated from the average sheet thickness $l$ to produce a core of the preset laminatedsheets thickness $L_o$. At a step 211B, a new skew angle $\Delta\theta(=\theta_o/N)$ is computed on the basis of the obtained laminated sheet number N and the preset skew amount $\theta_o$, and at a step 211C the computed skew angle $\Delta\theta$ is stored in the memory 45.

The respective processings shown at the steps 211A to 211C are carried out during a time period after the judgement result of the step 206 becomes YES before the judgement result of the step 210 becomes YES, in other words, while several or tens of iron core sheets 17 are drawn into the die 16. And the skew angle $\Delta\theta$ found at the step 211B is used in the skewing operation for a laminated iron core to be next made, as in the previous embodiment.

In the present embodiment, a sufficient time can be provided for the calculation at the steps 211A and 211B, which eliminates the need for the calculating circuit 43 to have a high-speed calculating ability.

When the thickness of the iron core sheet 7 is, for example, 0.5 mm in the both embodiments, there is a possibility that, after the last core sheet 17 in a core product has been piled, the laminated core thickness L tends to be thicker than $L_o$ ($L_o$+0.5 mm at maximum). In such a case, deviation from the desired thickness can be suppressed to about ±0.25 mm by pre-setting the reference value (at the step 107 or 210 in FIG. 10 or 11) to be ($L_o$−0.25 mm).

Although the servomotor has been used as a drive source for the skewing operation in the above embodiments, the servomotor may be replaced with a pulse motor or the like.

Further, a linear potentiometer has been employed as the stroke sensor 46 in the above embodiments, but a rotary encoder or the like may be also used together with rack and pinion means.

What is claimed is:

1. A method for controlling the operation of a punch press apparatus for forming, from a continuous metal strip, laminated metal cores with a preset skew amount and total thickness, each core consisting of a stacked plurality of punched core pieces, each piece having an offset tab which seats within a space in the immediately underlying core piece, comprising:

rotationally skewing the previously stacked, underlying pieces with respect to a piece presently being punched by a preselected skew angle, measuring, after each core piece is punched and stacked, the total thickness of the laminated core currently being formed, maintaining a count of the total number of core pieces presently included in said core being formed, terminating the formation of the core presently being formed when said measured total thickness reaches said preset value, computing, at the termination of formation, a new skew angle $\Delta\theta_o=\theta_o/n$, where $\theta_o$ is said preset skew amount and n is the total number of core pieces in said core, the formation of which was just terminated, and utilizing during the formation by said apparatus of the next laminated metal core, said new skew angle $\Delta\theta_o$ as said preselected skew angle.

2. A method for controlling the operation of a punch press apparatus for forming, from a continuous metal strip, laminated metal cores with a preset skew amount and total thickness, each core consisting of a stacked plurality of Punched core pieces, each piece having an offset tab which seats within a space in the immediately underlying core piece, comprising:

rotationally skewing the previously stacked, underlying pieces with respect to a piece presently being punched by a preselected skew angle, measuring, after each core piece is punched and stacked, the total thickness of the laminated core currently being formed, maintaining a count of the total number of core pieces presently included in said core being formed, computing, at a time $t_A$ when said total number of said core pieces reaches a preset value $n_A$ but before said total thickness reaches Lo, where Lo is said preset total thickness, a new skew angle $\Delta\theta_o=\theta_o/N$, where $\theta_o$ is said preset skew amount and $N=L_o/l$,$l$ being an average sheet thickness calculated by the formula $l=L_A/n_A$, where $L_A$ is the value at said time $t_A$ of the total thickness of the laminated core currently being formed, terminating the formation of the core presently being formed when said measured total thickness reaches said preset value $L_o$, and utilizing during the formation by said apparatus of the next laminated metal core said new angle $\Delta\theta_o$ as said preselected skew angle.

3. A method for producing laminated iron cores as set forth in claim 1 or 2, wherein rotational power is utilized to perform said skewing operation.

4. A method for producing laminated iron cores as set forth in claim 2, wherein said preset value nA is set to be about ⅔–¾ times a predetermined value of the total number of laminated iron core sheets.

5. A control apparatus for use with a punch press for forming, from a continuous metal strip, laminated metal cores with a preset skew amount and total thickness, each core consisting of a stacked plurality of punched core pieces, each piece having an offset tab which seats within a space in the immediately underlying core piece, said apparatus comprising:

means for rotationally skewing the previously stacked, underlying pieces with respect to a piece presently being punched by a preselected skew angle, means for measuring, after each core piece is punched and stacked, the total thickness of the laminated core currently being formed, means for maintaining a count of the total number of core pieces presently included in said core being formed, means for terminating the formation of the core presently being formed when said measured total thickness reaches said preset value, means for computing, at the termination of formation, a new skew angle $\Delta\theta_o = \theta_o/n$, where $\theta_o$ is said preset skew amount and n is the total number of core pieces in said core, the formation of which was just terminated, and means for utilizing during the formation by said apparatus of the next laminated metal core, said new skew angle $\Delta\theta_o$ as said preselected skew angle.

* * * * *